Aug. 9, 1927.
G. J. ROSSWORM ET AL
1,638,460
TIRE FLAP
Filed July 27, 1926
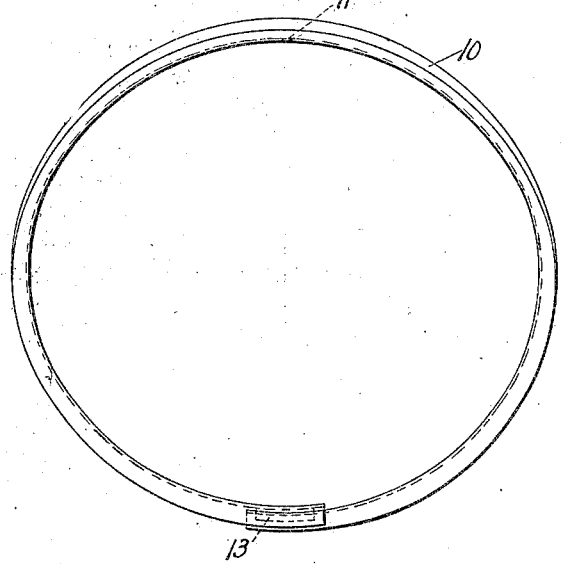
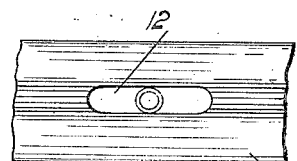
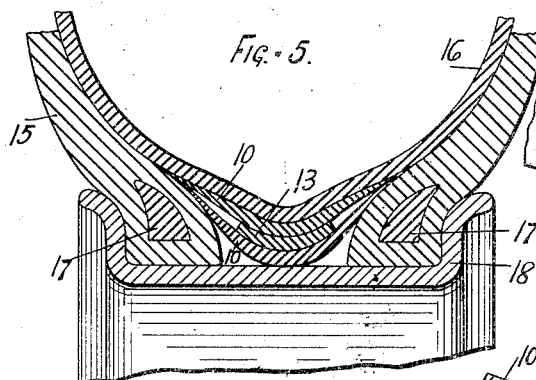
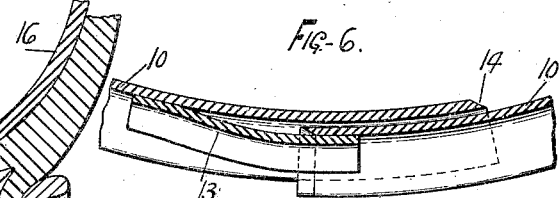
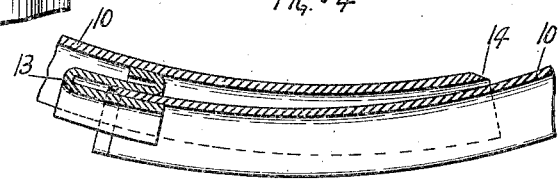
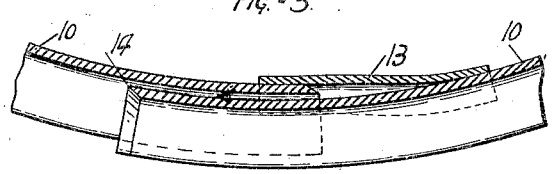
INVENTORS.
GEORGE J. ROSSWORM.
S. HODGE SMITH.
ATTORNEY.

Patented Aug. 9, 1927.

1,638,460

UNITED STATES PATENT OFFICE.

GEORGE J. ROSSWORM AND SAMSON HODGE SMITH, OF CUMBERLAND, MARYLAND.

TIRE FLAP.

Application filed July 27, 1926. Serial No. 125,195.

This invention pertains to certain improvements in tire flaps as hereinafter defined.

The tire flap is that narrow, protecting strip of material located between the beads of the tire and interposed between the inflatable inner tube of pneumatic tire assemblies and the metallic rim member whereby the tube is protected from injuries.

It is obviously desirable that a flap be so designed that its ultimate position in the inflated tire will be assumed without an appreciable excess or discrepancy. It should settle snugly upon the confining rim when mounted and the inner tube inflated, without localized buckling as will be the case if too long, or under tension as will be the case if too short, either of these common defects tending to destroy the relatively delicate inner tube. The buckled condition will create sharp angles that readily chafe the tube and eventually cause a rupture. The flap under tension will ultimately break away progressively at its weakest portion, thereby offering open creases into which the tube works and is ultimately destroyed by chafing, as in the case of a buckled flap.

Recognizing the above problem, the prior patented art and commercial practice has sought, by various means, to provide self-adjusting flaps that will at least partially remedy the chafing evil.

Flaps have been made of endless inflexible material, but these are not desirable, for a separate size must be manufactured and stocked for each slightly varying rim diameter.

Flaps have been made of endless elastic material to adjust themselves to various diameters and conditions, but such material is necessarily less desirable than that capable of being utilized in the relatively inextensible flap, and is subject to the further limitation that it tends to become "set" as installed and loses its only virtue of elasticity when re-used. Also, the range of adjustability to different diameters of rims is limited.

Flaps have been made by looping the material with overlapping ends and aperturing each end for the accommodation of the valve stem; one end being fixed at the valve stem and the other overlapping end slotted at the valve stem whereby a certain limited amount of diametrical adjustment is obtained. This arrangement sets up an unbalanced condition of the assembled structure by thus concentrating weights at one point on the circumference and sets up unfavorable local stresses at the valve; but the chief defect of this and similar assemblies is that the flap is not inherently capable of contracting to fit snugly about the rim at the critical time of mounting; all as more fully explained hereafter.

Flaps are also made by looping the material with suitably overlapped ends which are slidably aligned to permit of diametrical adjustment and constrained at the overlap against lateral misalignment. This type of flap as contrasted with the overlap-at-valve type is fixed on the valve stem by an aperture preferably arranged diametrically opposite the overlapping ends whereby better balance in the rotating assembly is attained. This type of flap is also inherently incapable of contraction to fit snugly about the rim at the critical mounting operation, as hereafter pointed out, and has other defects.

The significance of providing means for causing the flap to inherently contract and "snug" the rim seat at the time of application—and which characteristic has not been appreciated or met by the prior art—is readily understood by reference to the following description.

In the assembling of a casing, tube, flap, and rim, the following procedure is followed, assuming an adjustable flap is used:

The tube, partially inflated, having been pushed into the casing the flap is threaded over the valve stem and roughly centered within and between the gaping beads of the tire. In this condition the flap lies in more or less irregular waves, diametrically, and, is usually longer, diametrically, than the rim circumference. The thus assembled tire is then forced upon its rim member, secured, and final inflation proceeded with.

Now, the flap, as usually manipulated, goes into the casing and onto the rim too long. This excess is not corrected by any inherent property of the flap, as the overlapped slidable-end-flaps, regardless of type, not only do not tend to contract, but actually tend to set up frictional resistance to a contracting force at the overlap. This being so, any initial excess length of installed flap tends to remain unabsorbed, and, upon final inflation the excess will assume buckles of greater or less degree, but always a menace to the tube. The initial excess length of material cannot progressively crowd itself from the point of fixation on the valve stem back through the length of the stock to cause the free end to move and take up the slack. In the overlap-at-valve type the excess must be crowded back from the valve fixation point all the way around the casing. In the overlap-opposite-valve type the excess must travel backward from the valve halfway around the casing before it can be dissipated by effecting a relative sliding of overlapped end-on-end. Also, due to the condition of circumferential binding of the flap against the rim and the inside of the casing bead portions as the inner tube is inflated, the resistance to back creeping is too great to be overcome by recoil of the relatively inert flap, which will buckle locally as explained.

Being fully cognizant of the state of the art and with the defects inherent in various types of flaps in commercial use, it has become the object of this invention to provide improvements which will overcome previous defects.

Among the specific objects of our invention the following are cited:

To provide an efficient and economical flap of the character described that will adjust itself to various diameters of rims by linear expansion or contraction.

To provide an overlapped portion remote from the point of fixation on the valve stem with tension means therein located for exerting a contracting force tending to reduce the diameter of the said flap, but without impairing the ability of the said flap to increase its diameter within predetermined limits.

To provide in a self adjusting flap an overlapped portion elastically restrained against excessive longitudinal displacement tending to decrease or increase the diameter of the entire assembly.

To provide in a relatively inelastic flap structure, having self-adjusting overlapping ends elastically restrained against undue longitudinal displacement, a self-adjustable point of fixation at the valve stem whereby a limited circumferential movement of the flap may be effected remote from the overlapping portion.

Other objects and advantages will be more fully developed in the accompanying disclosure of a preferred form of the invention, it being understood that the invention may be modified and varied within the scope thereof as set forth in the claims.

In the drawings:

Figure 1 is a view showing the flap removed from the tire casing;

Figure 2 is a fragmental section in plan view in the vicinity of the valve stem opening showing a form of elongated slot to permit the flap to move within limits, longitudinally;

Figure 3 is a fragmental longitudinal section of the overlapped portion showing one manner for attaching the elastic portion;

Figure 4 is similar to Figure 3, but shows the free play of the elastic portion when the flap ends are considerably overlapped;

Figure 5 is a cross-section through a complete tire assembly, showing a preferred trough-like contour of the flap whereby the overlapping ends tend to maintain longitudinal alignment without guides, which inherently tend to restrain free sliding of one over the other; and Figure 6 is a view similar to Figure 3, but shows the elastic strip applied on the side next to the tube as a means for covering the end of the flap to make the inside surface practically smooth and thus completely eliminate any danger of chafing the tube.

10 represents the body of the flap, preferably of fabricated material, relatively inelastic and preferably of trough-like cross-sectional contour to fit the tube and incidentally facilitate the self alignment of the free ends at the overlap. The body of the flap is provided with an opening 11 to permit the passage of the valve stem. This opening can be located at any desired point about the flap and may be circular as shown in Figure 1 or circumferentially elongated as shown in Figure 2. This latter form may be preferred where some longitudinal movement of the body of the flap at this point is desired.

The ends of the flap are connected by a short strip of elastic material 13, securely fastened at each end and of sufficient length and resilience to give the desired properties to the flap as will be apparent from the description. The strip 13 may be secured to the side of the flap adjacent the tube as shown in Figure 6, or on the other side of the flap from the tube. It will be observed that the strip 13 is preferably secured at one end to the end of the flap and at the other end to a point remote from the flap end so that the ends of the flap will overlap.

The flap when duly inserted in the casing 15, with the inner tube 16 moderately inflated, should be so designed that the elastic 13 tends to pull the looped flap into a smaller circle. The pull is not sufficient to cause it to be displaced inwardly from between the beads 17. When the casing is finally slipped on the rim 18, the flap is liable to become stretched and excesses accumulated. The ordinary so-called self-adjusting flap does not absorb these excesses, but they are usually left as accumulated regardless of the best endeavors of the operator, for they are hidden from view and inaccessible and impossible of correction even if suspected to be present.

Excesses are promptly absorbed in the flap of our invention by the contraction of the elastic portion 13, and the entire circle made to "snug" the rim seat. The absence of guide loops or other foreign friction-creating agencies at the overlapped portion makes certain the free sliding of these ends one over the other to attain proper seating. To insure that there shall be no definite ridges at the step-off of the overlapped ends, it is customary to bevel the cut ends, as at 14.

If, by any chance, a definite buckle should form in the flap during installation and before final inflation of the inner tube, in the vicinity of the valve opening, and for some reason be unduly confined against working back toward the elastic portion on the near side of the valve, the excess may be pulled around the long diameter of the rim by the sliding of the flap provided with an elongated slot 12 (Figure 2). Thus it will be seen that the provision of an elongated slot 12 allows adjustment longitudinally of that portion of the flap remote from the overlap in either direction to compensate for any emergency binding tending to set up a buckle.

Should there be occasion for a flap to shorten beyond the limits of elastic restraint, as shown in Figure 4, it is at once apparent that this action will not be interfered with by the elastic member 13, which merely becomes inert and freely folds on its length without complications.

To afford full protection to the tube it is desirable that the overlapped ends be of such extent as to always present an area of crossing between tube and rim, and that the surface of the flap abutting the tube be at all points free of artificial obstructions, the least of which may eventually chafe through the delicate tubing. The manner of fitting the elastic shown in Figure 6 will assist in this particular.

In case the flap, under any possible freak of installation, be installed "short" on the rim in the initial set up, it is apparent that it will readily pull its proper length against the mild restraint of the elastic member. In fact, there is an additional advantage in that a "short" flap will be caused to straighten out and wrinkles or buckles fully eliminated by the resistance set up by the elastic connector, a factor not present in any type of inert overlapping-ended flap.

It is obvious that the preferred embodiment of our invention as disclosed may be practiced through a wide field of variation without departing from the scope and intent of the appended claims.

What is claimed is:

1. A tire flap comprising a strip of non-elastic material, the ends of which are overlapped, and an elastic contractile connector between the ends of the strip.

2. A tire flap comprising a strip of non-elastic fabric, the ends of which are overlapped, and an elastic connector between the ends of the strip operating to cause the strip to fit a tire rim snugly.

3. A tire flap comprising a strip of relatively inextensible material which is trough-shaped in cross-section to fit about the inner surface of an inner tube, the ends of the strip overlapping and unconnected except by a strip of contractile material connected to each end of the strip.

4. A tire flap comprising a strip of relatively non-elastic material having its ends overlapping, and a strip of elastic material permanently secured to the ends of the strip so that the ends are overlapped at all times.

5. A tire flap comprising a strip of relatively non-elastic material having its ends overlapping, and a strip of elastic material permanently secured to the ends of the strip so that the ends are overlapped at all times, the strip being provided with an opening remote from the ends thereof for the passage of the valve stem.

6. A tire flap comprising a strip of relatively non-elastic material, and a strip of elastic contractile material fastened near one end of the strip and to the strip at a point remote from the other end thereof so that the ends of the strip may overlap.

7. A tire flap comprising a strip of inextensible material having its ends overlapped, and an elastic connector for the ends of the strip adapted to contract the circumference thereof, the strip being provided with a valve stem opening remote from the connector.

G. J. ROSSWORM.
S. HODGE SMITH.